United States Patent Office 3,450,418
Patented June 17, 1969

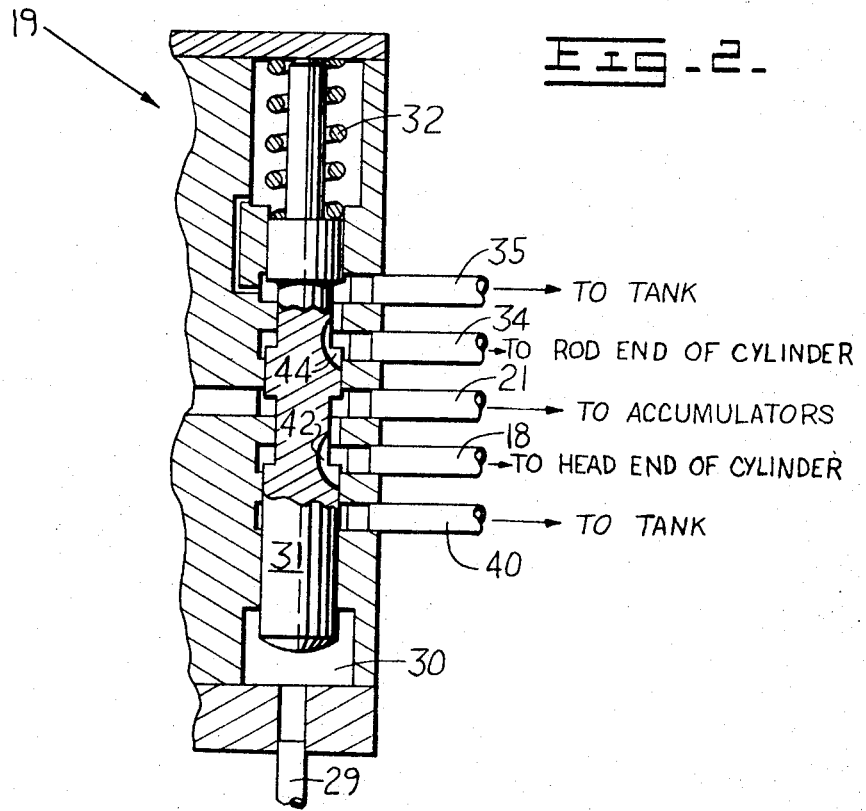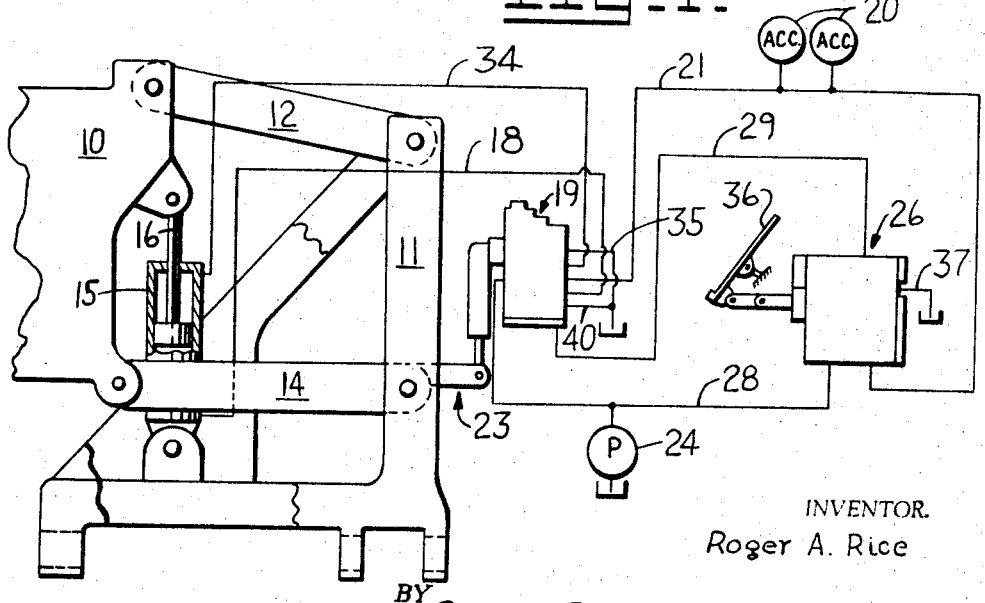

3,450,418
MEANS TO PROVIDE TEMPORARY FIRM SUPPORT FOR A RESILIENTLY SUPPORTED EARTHMOVING MACHINE
Roger A. Rice, Joliet, Ill., assignor to Caterpillar Tractor Co., Peoria, Ill., a corporation of California
Filed Nov. 21, 1966, Ser. No. 595,758
Int. Cl. B60d 1/00; F16d 57/00; E02f 3/62
U.S. Cl. 280—489                                 1 Claim

ABSTRACT OF THE DISCLOSURE

An earthmoving scraper including a two-wheel tractor and a two-wheel scraper coupled to each other with resilient means for suppressing bounce comprising a piston and cylinder forming a connection between the tractor and scraper and communicating at opposite sides of the piston with compressible fluid. This resilient connection includes means for directing pressure to the cylinder at the end which causes the scraper to move downwardly, thus preventing it from moving upwardly when it is engaged with the earth during a loading cycle. Means are also included to bleed the fluid from the opposite end of the cylinder, but at a rate which is gerater than the rate of admission of fluid, thereby to prevent a sudden application of downward pressure which might be destructive to the mechanism involved.

---

This invention relates to resiliently suspended earthmoving scrapers of the kind shown for example in our assignee's co-pending application to Barton, Carter and Roberts, Serial No. 461,887, for "System for Control of Pitch Bounce in Tractor-Trailer Combinations," now Patent Number 3,311,389.

The application referred to discloses a two-wheeled tractor and scraper combination with resilient means incorporated in the hitch to improve riding characteristics, particularly when the machine is moving over the surface of the earth, either loaded or unloaded. Such suspension is not desirable during the loading cycle because it is intended that the blade penetrate and operate at a desired depth in the earth, depending upon existing conditions. A blade that is free to float upwardly will usually not maintain a constant depth and the loading cycle is inefficient and productive of an irregular or "washboard" surface for succeeding cycles.

It is, therefore, the object of the present invention to provide simple means for temporarily rendering the resilient feature inoperative in a scraper suspension and simultaneously and automatically to provide means for holding its cutting edge firmly at the depth to which it has been lowered for a loading or unloading cycle. Further and more specific objects and advantages of the invention are made apparent in the following specification wherein reference is made to the accompanying drawing.

In the drawing:

FIG. 1 is a schematic view illustarting a hitch structure between a tractor and trailer and the resilient suspension means with which the present invention is used; and FIG. 2 is an enlarged central section showing the construction of a lockout valve employed in the suspension of FIG. 1 and embodying the present invention.

A portion of the forward end of a scraper is shown at 10 in FIG. 1 of the drawing as connected to the A-frame portion of a conventional hitch shown at 11, which is designed to be supported at the rear end of a tractor. Relative vertical movement between the members 10 and 11 is permitted by a pair of pivoted links 12 and 14 which support them. This movement is damped or cushioned by resilient suspension means comprising a cylinder 15 pivotally connected with the tractor A-frame and a piston reciprocal therein supported by rod 16 connected to the forward portion of the tailer. Hydraulic fluid in the cylinder below the piston and in supporting relationship therewith is in communication through a line 18 and a valve generally indicated at 19 with a pair of air over oil type accumulators 20 which are connected with the valve 19 by a compressible gas line 21.

The housing of the valve 19 contains a leveling valve, a pilot valve for actuating the leveling valve, and a lockout valve. The pilot and leveling valves are fully disclosed in the application referred to above, and the lockout valve will presently be described in detail. Generally speaking, downward movement of the piston in the cylinder 15 such as may be caused by leakage or by loading of the scraper causes actuation of the pilot valve through linkage generally indicated at 23. This, in turn, causes operation of the leveling valve which will open communication from a pump 24 and direct hydraulic fluid under pressure through the line 18 and to the head end of the cylinder until a normal or level attitude is attained.

A second valve housing generally indicated at 26 houses a safety, a lockout, and an accumulator bleed valve. The specific construction of the several valves contained in the valve housing 26 are not necessary to an understanding of the present invention, though they are fully described in a co-penidng application of Jessen, Junck and Rice, Ser. No. 602,082, entitled "Earthmoving Scraper Bowl Suspension With Safety Features." For the purpose of the present invention, it will suffice to understand that pressure from pump 24 is communicated by a line 28 through a valve in the housing 26 and then by a line 29 to the valve housing 19, and as shown in FIG. 2 to a chamber 30 at one end of a spool 31 of a lockout valve. This spool is urged downwardly as by a spring 32 at its opposite end. When pump pressure enters chamber 30, it is urged to its normal operating position as shown, with the head end of the cylinder communicating through lines 18 and 21 with the accumulators. The rod end of the cylinder communicates through a line 34 and a line 35 to the tank so that it is vented and does not hinder motion of the cylinder in either direction.

With the resilient suspension in its normal operating position as when the scraper is moving over the surface of the earth and with the spool 31 of the lockout valve in the position shown, the resiliency of the suspension can be locked out for loading purposes; and at the same time, pressure can be exerted at the cylinder rod end which tends to hold the bowl in its adjusted position and prevent upward floating of the cutting edge in the earth. This is accomplished through a foot pedal 36 shown in FIG. 1 which actuates a lockout valve mechanism in the manner described in application Ser. No. 602,082 to effect venting of pressure from chamber 30 of FIG. 2 through the line 29 to tank through a discharge line 37 shown schematically on the housing 26 in FIG. 1. Upon venting the chamber 30, spring 32 acts to move the valve spool downwardly, communicating the head end of the cylinder through line 18 and a line 40 to tank or, in effect, venting the head end of the cylinder. At the same time, the rod end of the cylinder previously vented is communicated through lines 21 and 34 with accumulator pressure. Therefore, this pressure acting within the rod end of the cylinder 15 urges the piston down to a position where the parts bottom and forcibly holds it downwardly to prevent upward floating of the cutting edge from the level at which it is held for loading purposes.

It is desirable that the downward movement which takes place in the linkage is not abrupt and thus it is also desirable that the accumulator pressure entering the rod end of the cylinder, which tends to impart downward movement, be ineffective until bottoming has occurred. To this end, communication between the head end of the cylinder and tank is limited or restricted by a narrow slot shown at 42 in spool 31, and only sufficient fluid passes through this slot between lines 18 and 40 to permit downward movement of limited speed. Similarly, a slot 44 in the spool will form the only communication between the accumulator line 21 and the cylinder rod end line 34. The slot 44, however, provides a greater restriction than the slot 42. Consequently, fluid will tend to bleed from the head end of the cylinder faster than fluid will be admitted to the rod end and no downward force will be imposed on the piston due to accumulator pressure until it has reached the bottom of its stroke. At this time, accumulator pressure will serve to prevent upward floating movement of the scraper cutting edge.

I claim:
1. In a tractor scraper combination including a hitch and cushion means comprising a cylinder and piston forming a connection between the tractor and scraper near the hitch, both the rod and head ends of the cylinder communicating with a source of compressible gas to permit relative up and down cushioned movement between the tractor and scraper, means to prevent upward movement of the scraper when it is lowered into loading position in the earth, said last means including a restriction to vent fluid from one end of the cylinder to permit a controlled rate of flow, and means to admit fluid to the other end of the cylinder including a restriction greater than the vent restriction, thus preventing the fluid admitted to the said other end of the cylinder from exerting a downward force on the piston until the movement of the piston is interrupted by mechanical means, said cushion means further including a spool valve with lands for obstructing flow and said restriction being slots of different size in said lands to control rates of flow.

References Cited

UNITED STATES PATENTS

| 3,059,914 | 10/1962 | Kemelhor | 267—64 XR |
| 3,135,529 | 6/1964 | Conrad | 280—489 |
| 3,275,314 | 9/1966 | Ostwald | 267—64 |
| 3,311,389 | 3/1967 | Barton et al. | 37—129 XR |
| 3,321,216 | 5/1967 | Carter | 37—126 XR |

EDGAR S. BURR, *Primary Examiner.*

U.S. Cl. X.R.

37—126, 129; 188—88